(No Model.) 2 Sheets—Sheet 1.

F. P. BURDGE.
CULTIVATOR, PLANTER, AND ROLLER.

No. 571,827. Patented Nov. 24, 1896.

Witnesses
E. H. Stewart

Inventor
Franklin P. Burdge
By his Attorneys,
C. A. Snow & Co.

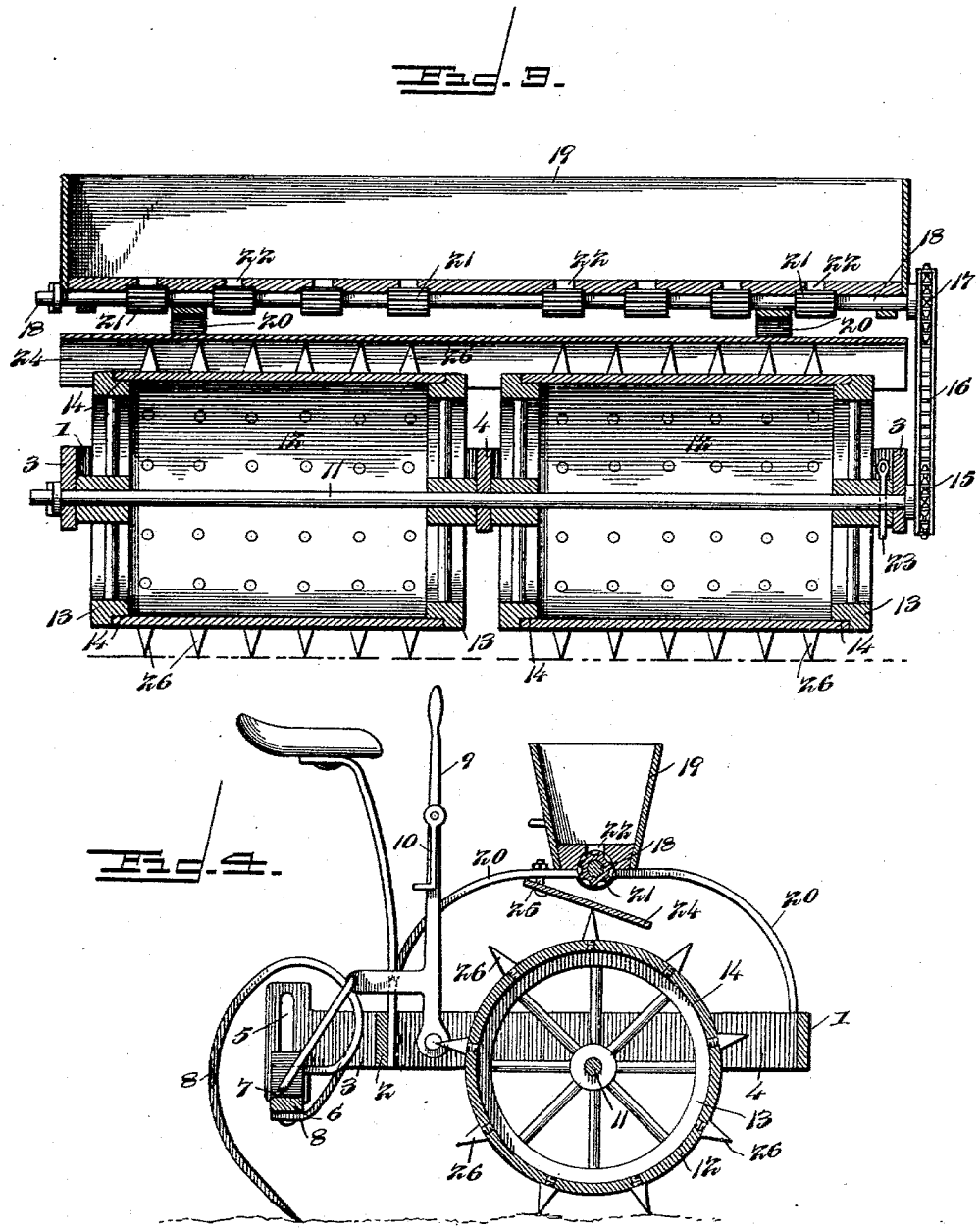

UNITED STATES PATENT OFFICE.

FRANKLIN PIERCE BURDGE, OF MONTEZUMA, OHIO.

CULTIVATOR, PLANTER, AND ROLLER.

SPECIFICATION forming part of Letters Patent No. 571,827, dated November 24, 1896.

Application filed May 8, 1896. Serial No. 590,762. (No model.)

*To all whom it may concern:*

Be it known that I, FRANKLIN PIERCE BURDGE, a citizen of the United States, residing at Montezuma, in the county of Mercer and State of Ohio, have invented a new and useful Cultivator, Planter, and Roller, of which the following is a specification.

My invention relates to cultivators and planters, and has for its object to provide a simple, inexpensive, and efficient construction and arrangement of parts whereby a single machine is adapted to perform the functions of a roller, a seeder, and a harrow, and whereby either or all of the parts thereof may be used at one time.

Further objects and advantages of this invention will appear in the following description, and the novel features thereof will be particularly pointed out in the appended claims.

Figure 1:
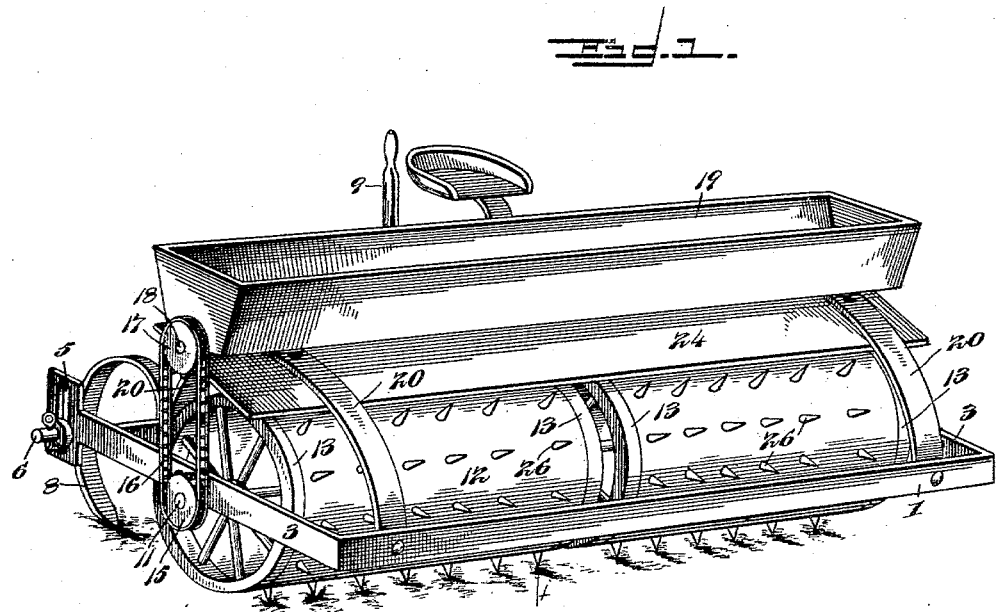
Figure 2:
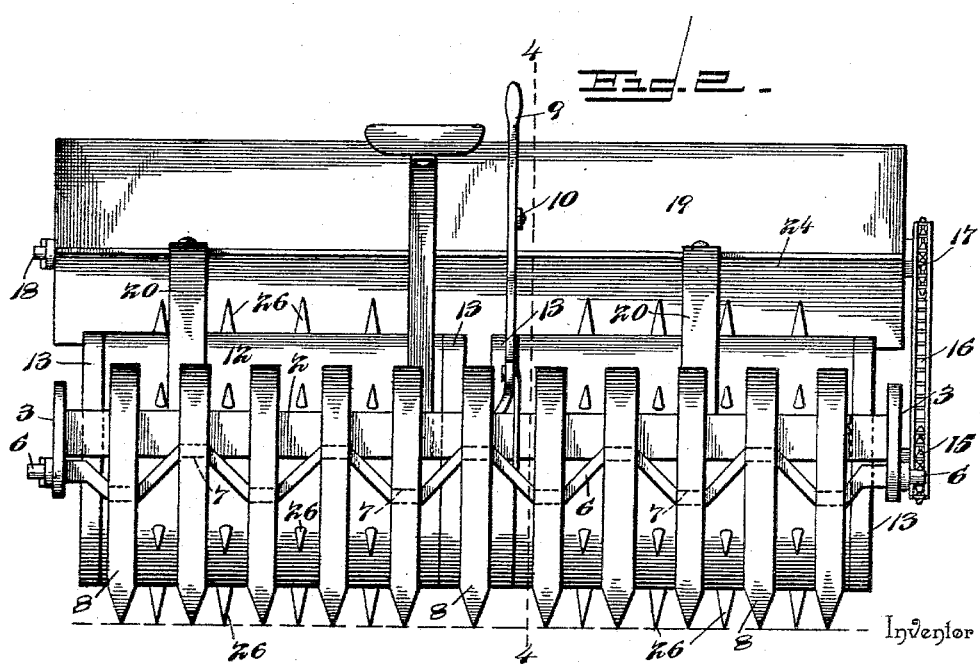

In the drawings, Figure 1 is a perspective view of a machine constructed in accordance with my invention. Fig. 2 is a rear view. Fig. 3 is a transverse vertical section in the plane of the alined axes of the rollers. Fig. 4 is a longitudinal vertical section on the plane indicated by line 4 4 of Fig. 2.

Similar numerals of reference indicate corresponding parts in all the figures of the drawings.

The frame of the improved machine embodies transverse front and rear beams 1 and 2, connected by the side beams 3 and a central longitudinal beam 4, said side beams being extended in rear of the rear transverse beam 2 and provided with vertical guide-slots 5 for the extremities of a transverse tooth-bar 6. This tooth-bar is of zigzag construction, having a plurality of vertical arches 7, extending alternately in opposite directions, and to the most remote points of the arches are attached spring harrow-teeth 8. Attached to the tooth-bar contiguous to its center is an operating-lever 9, fulcrumed upon the longitudinal central bar 4 of the frame and adapted to be held in its foremost position by means of a retaining-hook 10, whereby the tooth-bar is held in its elevated position with the harrow-teeth out of contact with the soil. The object in mounting the tooth-bar in vertical guides is to provide for the relative vertical movement of the frame and tooth-bar to allow the machine to accommodate itself to irregularities in the surface of the soil traversed, and the spaced upwardly-extending arches in said bar provide for the passage thereunder of trash which otherwise would be accumulated by the harrow-teeth.

Mounted in suitable bearings upon the side and central beams of the frame is a driving shaft or axle 11, and upon this driving shaft or axle, respectively between the side and intermediate beams 3 and 4, are rollers 12, having terminal wheels or heads 13, provided with flanges 14, to which are attached the extremities of the shells forming the rolls. Said wheels are preferably spoked, whereby the interior of the rollers is accessible.

Attached to one end of the driving shaft or axle is a chain-wheel 15, which is connected by means of a chain 16 with a corresponding wheel 17 on the feed-spindle 18, said spindle being mounted in suitable bearings contiguous to the bottom of the feed-box 19, which is arranged transversely above the plane of the frame and approximately in the vertical plane of the alined axes of the rollers, said feed-box being supported by side yokes 20. Any suitable construction of feed mechanism may be employed, that illustrated in the drawings, however, consisting of corrugated feed-wheels 21, arranged at intervals upon the feed-spindle under feed-openings 22 in the bottom of the seedbox.

When it is desired to operate the feeding mechanism for sowing seed, the driving shaft or axle is connected to the contiguous ground wheel or roller by means of a suitable clutch, such as a pin 23, engaged with registering perforations in the hub of said wheel and in the shaft, and when it is desired to use the rollers and harrow without the seeding mechanism this pin may be removed to allow independent rotary movement of the rollers.

The distributing-plate 24, which I preferably employ in connection with the seeding mechanism for broadcasting the seed, is provided at one edge with hangers 25 for engaging the yokes or other fixed portions of the frame, either in front or in rear of the seed-box, the opposite or free edge of said plate bearing upon and being supported by the rollers, and inasmuch as these rollers are toothed or spurred, as shown at 26, it is obvious that a continuous vibratory movement will be imparted to the plate to cause the proper distribution of the seed deposited thereon by the feeding mechanism. In the drawings the distributing-plate is shown supported at its rear edge to the side yokes in rear of the seedbox, whereby the front edge thereof rests upon the rollers; but it will be understood from the foregoing description that this position may be reversed when it is desired to sow in rear of the rollers. The rollers have the usual effect of cultivating the surface of the soil and causing the seed to be properly embedded therein.

The machine embodying my invention may be used for cultivating corn or similar plants arranged in rows by removing the central tooth, whereby the soil upon both sides of a row may be simultaneously disturbed.

Various changes in the form, proportion, and the minor details of construction may be resorted to without departing from the spirit or sacrificing any of the advantages of this invention.

Having described my invention, what I claim is—

1. The combination with a supporting-frame and ground-wheels, of a tooth-bar arranged transversely with its extremities fitted in vertical guides upon the frame, said bar being of zigzag construction and having alternate upwardly and downwardly extending arches arranged in a vertical plane, and harrow-teeth carried by said bar and affixed to the same, respectively, at the centers of the upwardly and downwardly extending arches, substantially as specified.

2. The combination with a supporting-frame, of a driving shaft or axle, coaxial rollers loosely mounted upon said shaft or axle and provided with spurs or teeth, seeding mechanism operatively connected with the driving shaft or axle, and a distributing or broadcasting plate loosely attached at one edge to the frame and resting at its free edge upon the spurs or teeth of the rollers for vibration thereof, substantially as specified.

3. The combination with a supporting-frame; a driving shaft or axle, coaxial spurred drums upon said shaft or axle to traverse the soil, and seeding mechanism operatively connected with the driving shaft or axle and having a seedbox arranged above said drums, of a distributing or broadcasting plate provided at one edge with clips to engage fixed portions of the frame in front or in rear of the seedbox and adapted to rest at its free edge upon the surfaces of the rollers for vibration by the spurs thereof, substantially as specified.

In testimony that I claim the foregoing as my own I have hereto affixed my signature in the presence of two witnesses.

FRANKLIN PIERCE BURDGE.

Witnesses:
ALVIN LACY,
C. A. BURDGE.